(12) United States Patent
Kim et al.

(10) Patent No.: US 11,262,994 B2
(45) Date of Patent: Mar. 1, 2022

(54) METHOD AND DEVICE FOR IDENTIFYING TYPE OF VARIABLE IN BINARY

(71) Applicant: KOREA INTERNET & SECURITY AGENCY, Jeollanam-do (KR)

(72) Inventors: Hwan Kuk Kim, Jeollanam-do (KR); Tae Eun Kim, Jeollanam-do (KR); Dae Il Jang, Jeollanam-do (KR); Jong Ki Kim, Jeollanam-do (KR); Jee Soo Jurn, Jeollanam-do (KR); Geon Bae Na, Jeollanam-do (KR)

(73) Assignee: KOREA INTERNET & SECURITY AGENCY, Jeollanam-do (KR)

( * ) Notice: Subject to any disclaimer, the term of this patent is extended or adjusted under 35 U.S.C. 154(b) by 0 days.

(21) Appl. No.: 16/935,152

(22) Filed: Jul. 21, 2020

(65) Prior Publication Data
US 2021/0132924 A1    May 6, 2021

(30) Foreign Application Priority Data
Nov. 5, 2019    (KR) .......................... 10-2019-0139853

(51) Int. Cl.
*G06F 8/53* (2018.01)
*G06F 9/30* (2018.01)

(52) U.S. Cl.
CPC .............. *G06F 8/53* (2013.01); *G06F 9/3013* (2013.01)

(58) Field of Classification Search
CPC .................................. G06F 8/53; G06F 9/3013
See application file for complete search history.

(56) References Cited

U.S. PATENT DOCUMENTS

| 5,854,924 A * | 12/1998 | Rickel ................ G06F 11/3604 717/132 |
| 9,772,925 B2 * | 9/2017 | Miskelly .................. G06F 8/53 |
| 2018/0189042 A1 * | 7/2018 | Noonan .................... G06F 8/53 |
| 2020/0174765 A1 * | 6/2020 | Schulte ..................... G06F 8/53 |

FOREIGN PATENT DOCUMENTS

| KR | 10-2006-0104505 A | 10/2006 |
| KR | 10-2009-0056622 A | 3/2009 |
| KR | 10-2018-0047914 A | 5/2018 |
| KR | 10-2018-0060497 A | 6/2018 |
| KR | 10-2019-0041912 A | 4/2019 |
| KR | 1019793290000 B | 5/2019 |

OTHER PUBLICATIONS

Caballero et al., "Type Inference on Executables" (Year: 2016).*
ElWazeer et al., "Scalable Variable and Data Type Detection in a Binary Rewriter" (Year: 2013).*
Solovev et al., "Next-Generation Intermediate Representations for Binary Code Analysis" (Year: 2019).*
Padaryan et al., "Automated Exploit Generation for Stack Buffer Overflow Vulnerabilities" (Year: 2014).*
Ha et al., "REPICA: Rewriting Position Independent Code of ARM" (Year: 2018).*

* cited by examiner

*Primary Examiner* — Phillip H Nguyen
(74) *Attorney, Agent, or Firm* — Studebaker & Brackett PC

(57) ABSTRACT

A method for identifying a type of a variable within a binary performed on a computing device is provided. The method comprises, identifying a variable from disassembly code of a binary, and determining a type of the variable based on an instruction of the disassembly code, associated with the variable.

12 Claims, 16 Drawing Sheets

| Line # | original assembly code | result of giving the general purpose register unique identifier |
|---|---|---|
| #01 | push %ebp | push %ebp |
| #02 | mov %esp, %ebp | mov %esp, %ebp |
| #03 | subl $0x10, %esp | subl $0x10, %esp |
| #04 | movl 0x8(%ebp), %ebx | movl 0x8(%ebp), %ebx1 |
| #05 | movl 0xc(%ebp), %ecx | movl 0xc(%ebp), %ecx1 |
| #06 | movl 0x10(%ebp), %edx | movl 0x10(%ebp), %edx1 |
| #07 | movl %ebx, %eax | movl %ebx1, %eax1 |
| #08 | add %eax, $5 | add %eax1, $5 |
| #09 | mov %eax, -0x4(%ebp) | mov %eax1, -0x4(%ebp) |
| #10 | movl %ecx, %eax | movl %ecx1, %eax2 |
| #11 | add %eax, $3 | add %eax2, $3 |
| #12 | mov %eax, -0x8(%ebp) | mov %eax2, -0x8(%ebp) |
| #13 | mov %edx, %eax | mov %edx1, %eax3 |
| #14 | sub %eax, $2 | sub %eax3, $2 |
| #15 | mov %eax, -0xc(%ebp) | mov %eax3, -0xc(%ebp) |
| #16 | mov -0x4(%ebp), %eax | mov -0x4(%ebp), %eax4 |
| #17 | mov -0x8(%ebp), %ebx | mov -0x8(%ebp), %ebx2 |
| #18 | imul %eax, %ebx | imul %eax4, %ebx2 |
| #19 | push %eax | push %eax4 |
| #20 | mov -0xc(%ebp), %ebx | mov -0xc(%ebp), %ebx3 |
| #21 | imul %eax, %ebx | imul %eax4, %ebx3 |
| #22 | push %eax | push %eax4 | increment of the general purpose register unique identification value

FIG. 5a

| user function identifier | unique general purpose register | assigned value |
|---|---|---|
| [function ID #1] | eax1 | -0x56(%ebp) |
| [function ID #1] | eax2 | -0x44(%ebp) |
| [function ID #1] | eax3 | -0x1c(%ebp) |
| [function ID #1] | ebx2 | -0x18(%ebp) |
| [function ID #1] | edx1 | -0x10(%ebp) |
| ... | ... | ... |

FIG. 5c

| NO. | user function identifier | localType | variableID | ebpDistance | variableSize | variableType | inferenceLevel |
|---|---|---|---|---|---|---|---|
| 1 | [function ID #1] | 1 | -0x56(%ebp) | 0x56 (86) | 18 | - | - |
| 2 | [function ID #1] | 1 | -0x44(%ebp) | 0x44 (68) | 40 | - | - |
| 3 | [function ID #1] | 1 | -0x1c(%ebp) | 0x1c (28) | 4 | - | - |
| 4 | [function ID #1] | 1 | -0x18(%ebp) | 0x18 (24) | 8 | - | - |
| 5 | [function ID #1] | 1 | -0x10(%ebp) | 0x10 (16) | 8 | - | - |
| 6 | [function ID #1] | 1 | -0x8(%ebp) | 0x8 (8) | 8 | - | - |

FIG. 6

| No. | Classification | OPCODE (mnemonic) | Target | Variable Type | Level |
|---|---|---|---|---|---|
| 1 | Integer Instructions | cmpl | Operand 1,2 | int4 | 1 |
| 2 | | movw | | int2 | |
| 3 | | movl | | int4 | |
| 4 | | addl | | int4 | |
| 5 | String Instructions | movs | Operand 2 | char(n) or ptr4 | 2 |
| 6 | | movsb | | | |
| 7 | | movsw | | | |
| 8 | | movsl | | | |
| 9 | Store String Data | stos | Operand 2 | char(n) or ptr4 | 2 |
| 10 | | stosb | | | |
| 11 | | stosw | | | |
| 12 | | stosl | | | |
| 13 | Load String Operand | lods | Operand 1 | char(n) or ptr4 | 2 |
| 14 | | lodsb | | | |
| 15 | | lodsw | | | |
| 16 | | lodsl | | | |
| 17 | Compare String Operands | cmps | Operand 1,2 | char(n) or ptr4 | 2 |
| 18 | | cmpsb | | | |
| 19 | | cmpsw | | | |
| 20 | | cmpsl | | | |
| 21 | Compare String Data | scas | Operand 1 | char(n) or ptr4 | 2 |
| 22 | | scasb | | | |
| 23 | | scasw | | | |
| 24 | | scasl | | | |
| 25 | Store Real and Pop | fstp | Operand 1 | float4 or double8 | 4 |
| 26 | | fstps | | float4 | |
| 27 | | fstpl | | double8 | |

FIG. 9

METHOD AND DEVICE FOR IDENTIFYING TYPE OF VARIABLE IN BINARY

CROSS-REFERENCE TO RELATED APPLICATION

This application claims priority from Korean Patent Application No. 10-2019-0139853 filed on Nov. 5, 2019 in the Korean Intellectual Property Office, and all the benefits accruing therefrom under 35 U.S.C. 119, the contents of the application in its entirety is herein incorporated by reference.

BACKGROUND

1. Technical Field

The present disclosure relates to a method and device for identifying a type of a variable in a binary. More specifically, it relates to a method and system for inferring and determining a size of an array and the type of variables in a binary.

2. Description of the Related Art

In the process of developing a program, generally, one logically analyzes and verifies contents of source code of a program, or one uses a debugging program to set breakpoints in the source code of the program where there is a possibility of vulnerability. Then, when the execution is suspended according to the break point during the execution of the program, the vulnerability of the program is analyzed by observing the execution environment of the program. When a program's source code is given, a list of variables used in the program and variable types may be identified on the source code. Therefore, vulnerabilities related to buffer overflow, integer overflow, and type confusion may be relatively easily identified. In addition, when a vulnerability is found, the source code is corrected to rebuild the program, thereby complementing the vulnerability.

However, after a program is developed, especially based on a third party who is not the program's developer analyzing and patching the program's vulnerability, vulnerability analysis and patching are mostly performed on program binaries in environments where source code cannot be obtained. Therefore, the methods described above may not be utilized. For example, information on a type of a variable and a size of a buffer is required to search for a vulnerability, analyze a cause, and patch a binary to compensate for the vulnerability. However, a method for automatically obtaining the information from a program binary is not provided.

SUMMARY

Aspects of the present disclosure provide a method and device for identifying a type of a variable in a binary.

Aspects of the present disclosure also provide a method and device for identifying a list of local variables used by each of user functions defined in a binary.

Aspects of the present disclosure also provide a method and device for determining the most reliable type among a plurality of types inferred for variables in a binary.

Aspects of the present disclosure also provide a method and device for determining a size of a variable and array (buffer) used in a user function defined in a binary.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a method for identifying a type of a variable within a binary performed on a computing device is provided. The method comprises, identifying a variable from disassembly code of a binary, and determining a type of the variable based on an instruction of the disassembly code, associated with the variable.

According to an aspect of the present disclosure, a method for identifying a size of a variable in a binary performed on a computing device is provided. The method comprises identifying a plurality of variables from disassembly code of a binary, determining, for each of the plurality of variables, an initial value of the size of the variable, and determining, for each of the plurality of variables, the size of the variable based on an inferred variable type and the initial value of the size of the variable.

According to an aspect of the present disclosure, a device for identifying a type of a variable in a binary is provided. The device comprises, a variable information collection unit, a variable type inference unit, and a variable type determination unit, wherein the variable information collection unit, analyzes disassembly code of the binary, and identifying a plurality of operands as each variable, the operands accessing a memory using a base pointer register and an index value, and determines an initial value of a variable size for each variable based on the index value corresponding to each variable, wherein the variable type inference unit determines a variable type candidate for each variables based on at least one of an instruction using each variable as an operand and a standard library function using each variable as a parameter, and inferring the type of each variable based on the variable type candidate, and wherein the variable type determination unit determines the type and size of each variable based on the inferred type of the variable and the initial value of the variable size.

BRIEF DESCRIPTION OF THE DRAWINGS

The above and other aspects and features of the present disclosure will become more apparent by describing in detail exemplary embodiments thereof with reference to the attached drawings, in which:

FIGS. 5A and 5B are diagrams for explaining an exemplary method in which a register analysis component shown in FIG. 3 traces a final value of a register, and FIG. 5C is a view for explaining an example of variable identification information generated by the register analysis component;

FIG. 6 is a diagram illustrating exemplary stack frame information generated by a stack frame analysis component illustrated in FIG. 3;

FIG. 8 is a diagram for explaining the operation of the type inference unit shown in

FIG. 7;

FIG. 9 is a diagram illustrating exemplary assembly instructions that a variable type inference execution component illustrated in FIG. 7 may refer to for inferring a variable type;

DETAILED DESCRIPTION OF THE EMBODIMENTS

Figure 1:
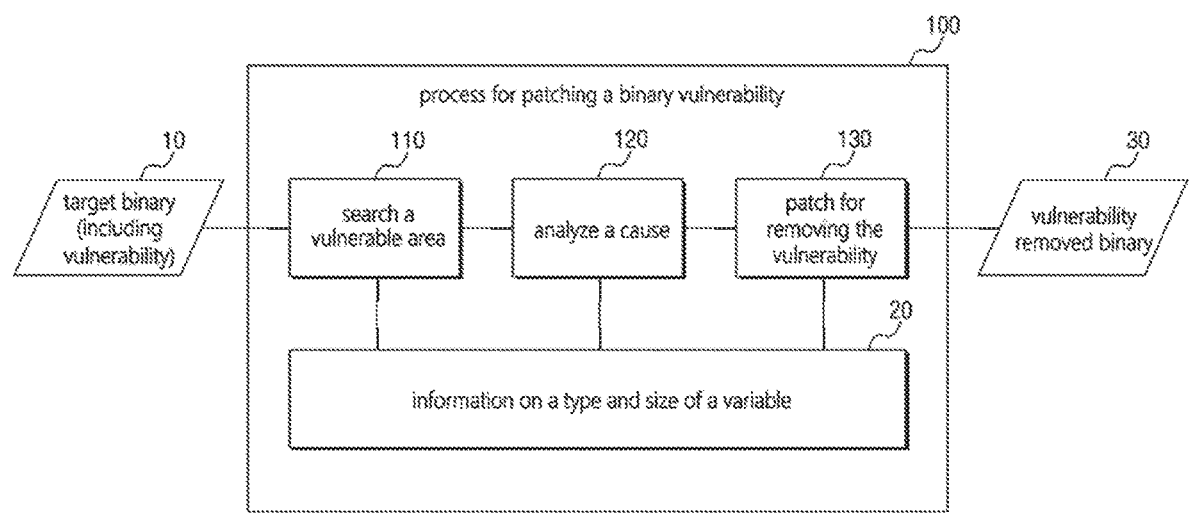
FIG. 1 is a view for explaining an exemplary environment in which information on a variable type and size determined by various embodiments of the present disclosure is used.

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure may be defined by the appended claims.

In adding reference numerals to the components of each drawing, it should be noted that the same reference numerals are assigned to the same components as much as possible even though they are shown in different drawings. In addition, in describing the present disclosure, based on it being determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing embodiments and is not intended to be limiting of the present disclosure. In this specification, the singular also includes the plural unless specifically stated otherwise in the phrase.

In addition, in describing the component of this present disclosure, terms, such as first, second, A, B, (a), (b), can be used. These terms are for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present disclosure will be described in detail with reference to the accompanying drawings.

First, referring to FIG. 1, it will be described that variable type and size information determined by embodiments of the present disclosure may be used in a series of processes of patching a vulnerability in a program binary. FIG. 1 1 schematically shows a process of patching a vulnerability in a program binary.

First, vulnerability identification and patch target binaries 10 are given, and vulnerability area search or a vulnerability discovery process 110 for the target binaries 10 may be performed. The vulnerability search 110 may be performed using various conventional techniques such as fuzzing, symbolic execution, and hybrid fuzzing combining them.

The fuzzing may be a method that creates a situation where a program crashes by repeatedly generating arbitrary values (test cases) and inputting them into a target program. The symbolic execution may be a method for specifying an input value of a target program as a symbol and finding a value that may reach a path of the program's vulnerability. The hybrid fuzzing may be a technique that combines fuzzing and symbolic execution. It may be a way to use fuzzing in shallow paths to quickly explore vulnerabilities, and to search for vulnerabilities by using symbolic execution based on a path search no longer being possible.

However, even with hybrid fuzzing, a code area (i.e., coverage) that may search for vulnerabilities reaches the limit, and situations in which coverage may no longer be increased frequently occur. In order to further search unexplored areas that have not been searched by conventional methods for searching vulnerabilities, techniques for changing a control flow of the target binary 10 have been studied to identify a user function including unexplored areas and to directly fuzz parameters of the user function.

As described above, in order to expand vulnerability search coverage of the target binary 10, information on the type and size of variables existing in the binary may be used to be able to directly fuzz the parameters of the user function existing in the binary.

It will be described with reference to FIG. 1 again. A process 120 of analyzing a cause of vulnerability may be performed based on information on vulnerability discovery area and crash information calculated as a result of performing the vulnerability search 110 for the target binary 10. There may be many different causes and types of vulnerabilities in binaries. From 2010 to 2015, about 80,000 security vulnerabilities (CVEs) were registered in the National Vulnerability Database (NVD), which may be a vulnerability database, and it has been increasing continuously in recent years. Some of typical types of various security vulnerabilities may be buffer overflow or integer overflow types that store data exceeding the allocated storage space, a variable type error type, a vulnerability type used without initializing a variable, etc. Information on the type and size of variables may be used to analyze the types and causes of vulnerabilities from vulnerability search results.

Next, a process 130 of patching to remove vulnerabilities of FIG. 1 will be described. As described above, according to the types and causes of various vulnerabilities, various patch types and patch application methods for removing the vulnerabilities should be selected. For example, information on the types and sizes of the variables may be used in various processes from the step of generating various types of patch code, such as variable initialization patch, function parameter verification or change patch, control flow change patch, etc., to the step of selecting patching methods such as function-based patching and instruction-based patching, and applying a patch.

So far, it has been described with reference to FIG. 1 that variable type and size information determined by embodiments of the present disclosure may be used in a process of patching a vulnerability in a program binary. Hereinafter, a method and device for inferring a type of a variable in a binary according to various embodiments of the present disclosure will be described in detail with reference to FIGS. 2 to 12.

Figure 2:
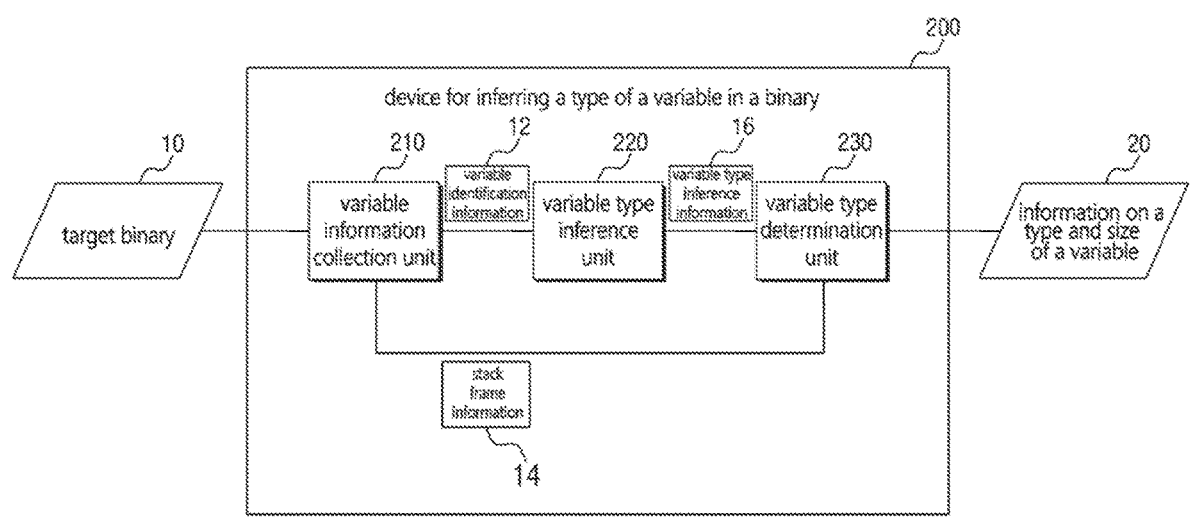
FIG. 2 is a block diagram of a device for inferring a type of a variable in a binary according to an embodiment of the present disclosure.

FIG. 2 is a block diagram of a device 200 for inferring a type of a variable in a binary according to an embodiment of the present disclosure.

The device 200 for inferring the type of the variable in the binary according to the present embodiment may be configured as a variable information collection unit 210, a type inference unit 220, and a type determination unit 230. The device 200 according to the present embodiment receives a target binary 10 to be analyzed for variable information as an input, and generates and outputs information 20 about the type of the variable and a size of an array for each user function defined in the target binary 10.

The variable information collection unit 210 classifies assembly code (or referred to as 'disassembly code') calculated by disassembling the target binary 10 for each user-defined function, and structures it in units of assembly instructions. In addition, the variable information collection unit 210 identifies variables from the assembly code classified for each user-defined function and structured in units of instructions. In addition, the variable information collection unit 210 initially analyzes a stack frame of each user-defined function from the structured assembly code. Based on the analysis, stack frame information 14 on stack frame blocks corresponding to data stored in the stack frame may be generated.

The variable information collection unit 210, although not shown, provides the structured assembly code to the type inference unit 220 and the type determination unit 230, which will be described later. In addition, the variable information collection unit 210 provides variable identification information 12 to the type inference unit 220 and the stack frame information 14 to the type determination unit 230. More details regarding the configuration and operation of the variable information collection unit 210 will be described later with reference to FIGS. 3 to 6.

The type inference unit 220 generates variable type inference information 16 for each user-defined function based on the structured assembly code (not shown) and variable identification information 12 provided from the variable information collection unit 210, and type inference pattern information. The variable type inference information 16 generated by the type inference unit 220 may be provided to the type determination unit 230 to be described later. More details regarding the configuration and operation of the type inference unit 220 will be described later with reference to FIGS. 7 to 10.

The type determination unit 230 finally determines each variable type and variable size (including the size of the array) for each user function by synthesizing the variable type inference information 16 and the stack frame information 14. Variable type and size information 20 generated by the type determination unit 230 may be used in the process of patching the vulnerability of the binary as described above.

It may be noted that he variable information collection unit 210, the type inference unit 220, and the type determination unit 230 of the device 200 for inferring the type of the variable described so far with reference to FIG. 2 may be implemented in one or two configurations depending on embodiments.

Hereinafter, the configuration and operation of the variable information collection unit 210 of the device 200 for inferring the type of the variable will be described in detail with reference to FIGS. 3 to 6.

Figure 3:
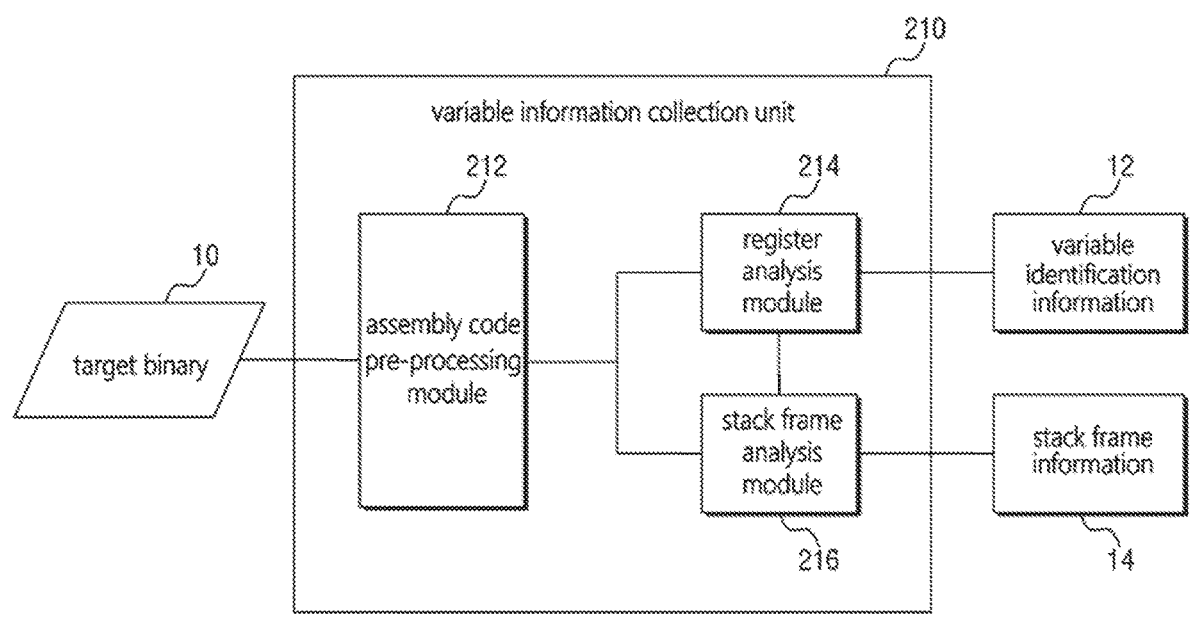
FIG. 3 is a block diagram of a variable information collection unit of the device for inferring the type of the variable in the binary shown in FIG. 2.

FIG. 3 is a block diagram of the variable information collection unit 210. The variable information collection unit 210 may include an assembly code pre-processing component 212, a register analysis component 214, and a stack frame analysis component 216.

The assembly code pre-processing component 212 generates assembly code by disassembling the target binary 10 composed of machine language. Here, the assembly code pre-processing component 212 may generate assembly code using a program such as 'objdump.' In addition, the assembly code pre-processing component 212 classifies and stores the assembly code for each user-defined function. In addition, the assembly code pre-processing component 212 structures the assembly code classified for each of the user-defined functions in units of assembly instructions. For example, a list may be constructed in which each instruction included in the assembly code may be a node.

The register analysis component 214 analyzes the structured assembly instructions for each user function and identifies a general purpose register that may be likely a local variable among general registers used as the instruction's operand. Then, it stores identified general purpose register information as the variable identification information 12.

As a preparation process for this, in one user function, a unique identification value may be given to a general purpose register to distinguish the same general purpose register that has been used multiple times to store values of different variables. Also, in a user function, instructions for assigning a value to a general purpose register may be traced to obtain a final value assigned to the general purpose register. This will be described later with reference to FIGS. 5A and 5B.

The register analysis component 214 may provide the variable identification information 12 to the type inference unit 220.

The stack frame analysis component 216 identifies operands having a pattern estimated as a variable among operands of instructions in the user function, and generates the stack frame information 14.

Local variables (including arrays) defined in the user function may be allocated storage space in the stack frame allocated to the user function during compiling. The storage space for each variable in the assembly code may be accessed using a distance (or may be referred to as a 'relative address') from a base pointer register value that stores a memory address of a bottom of the stack frame of the user function.

In assembly code, operands that access a memory using a relative address to a memory address stored in a base pointer register (e.g., an EBP register) may be a variable. In other words, operands expressed as base pointer registers and index values (relative addresses) may be estimated as variables. For example, based on an operand of an assembly instruction being 0xN (% ebp) or −0xN (% ebp) (where N may be any number), the operand may be an operand having a variable estimation pattern.

The stack frame analysis component 216 generates stack frame blocks corresponding to the variable estimation patterns based on the variable estimation patterns. The stack frame analysis component 216 sorts the stack frame blocks based on a location in a stack frame, calculates an initial value regarding a size of a variable corresponding to each block, and stores the initial value in each stack frame block. The structure of the stack frame block will be described later with reference to FIG. 6.

The stack frame analysis component 216 may provide the stack frame information 14 including the stack frame blocks to the type determination unit 230.

Figure 4:
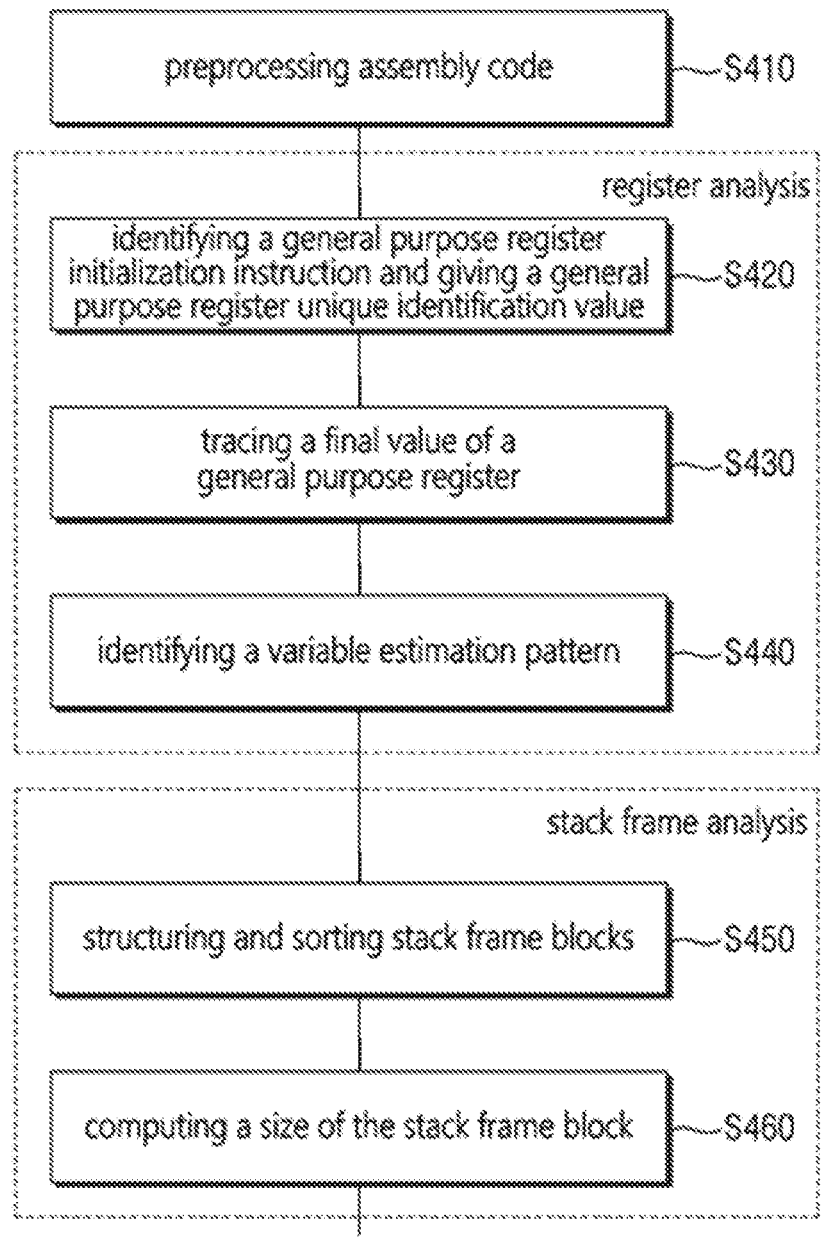
FIG. 4 is a diagram for explaining the operation of the variable information collection unit shown in FIG. 3.

Hereinafter, the operation of the variable information collection unit 210 will be described with reference to FIG. 4. In interpreting the operation of the variable information collection unit 210, the contents described above with reference to FIG. 3 regarding the assembly code preprocessing component 212, the register analysis component 214, and the stack frame analysis component 216 may be reflected.

First, step S410 may be performed by the assembly code preprocessing component 212. In step S410, the target binary 10 may be input, and assembly code corresponding to the target binary 10 may be preprocessed. Specifically, the target binary 10 composed of machine language may be disassembled to generate assembly code, and the assembly code may be classified and stored for each user-defined function. In addition, the assembly codes classified for each user-defined function may be structured in units of assembly instructions. For example, a list may be constructed in which each instruction included in the assembly code may be a node.

Steps S420 to S440 may be performed by the register analysis component 214.

In step S420, general purpose register initialization instructions may be identified from the structured assembly instructions, and a general purpose register unique identification value may be given to the structured assembly instructions.

Within one user function, each general purpose register (EAX, EBX, ECX, EDX register, etc.) may be used multiple times to store values of different variables. In order to distinguish which variable each general purpose register used as an operand of each assembly instruction corresponds to, initialization instructions of the general purpose register may be identified, and a unique identification value may be given each time the general purpose register may be initialized.

Assembly instructions for initializing a general purpose register include 'mov,' 'lea,' and 'xor' instructions (including similar instructions 'movb,' 'movw,' 'movl,' etc.). Based on an instruction in which the general purpose registers may be used as a second operand of the initialization instructions may be found, a unique identification value that identifies a general purpose register may be given, thereby modifying an instruction. In addition, based on an instruction of subsequent instructions not corresponding to the initialization instruction, the instruction may be modified by reflecting a general purpose register unique identification value previously given.

FIG. 5A is a diagram for explaining an example in which a general register unique identification value may be given to an assembly instruction according to the method. In a table shown in FIG. 5A, a second column describes original assembly code, and a third column describes modified assembly code to give a unique identification value to general purpose registers. Portions highlighted in bold in the second column represent instructions for initializing general purpose registers and general purpose registers to be initialized. Portions highlighted in bold in the third column represent modified instructions by assigning new unique identification values to general purpose registers. Underlined portions in the third column represent modified instruction by reflecting a previous unique identification value for general purpose registers as it is.

Rows #04 to #07 of FIG. 5A may be instructions corresponding to an initialization instruction (one of 'mov,' 'lea,' or 'xor') for general purpose registers (EAX, EBX, ECX, and EDX). Referring to the third column, unique identification values for distinguishing the eax, ebx, ecx, and edx registers may be given and modified to eax1, ebx1, ecx1, and edx1, respectively. Instructions on rows #08 to #09 in FIG. 5A do not correspond to an instruction for initializing a general purpose register. The eax register described in instructions in rows #08 to #09 was modified to eax1 by maintaining a previous unique identification value for the eax register. Instructions in row #10 of FIG. 5A includes an instruction ('mov') to re-initialize the eax register. A new unique identification value eax2, which may be distinguished from the previous unique identification value eax1, may be given, and the instruction may be modified. It may be understood that instructions in rows #11 to #22 of FIG. 5A may also be modified to be given a new unique identification value for a new general purpose register for each instruction that initializes a general purpose register in the same manner as above.

It will be described with reference to FIG. 4 again. In step S430, modified instructions may be analyzed by assigning a unique identification value to general purpose registers in step S420 described above, and final values assigned to each unique general purpose register (general purpose registers given with unique identification values such as eax1, eax2, ebx1, ebx2, etc.) may be traced.

Figure 5B:
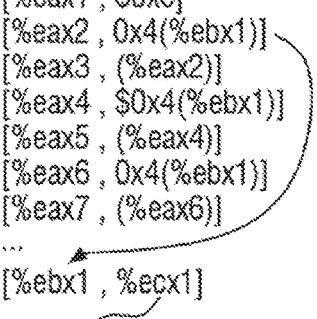

First, based on instructions that assign values to each unique general purpose register, a value assigned to each unique general purpose register may be identified. A first column of a table shown in FIG. 5B shows an exemplary result in which values assigned to the unique general purpose registers (eax1, eax2, ebx1, ecx1, edx1) corresponding to the general purpose registers (EAX, EBX, ECX, EDX) may be identified. However, it should be noted that values assigned to the unique general purpose registers, which may be exemplarily illustrated in FIG. 5B, may be separate examples irrelevant to the exemplary assembly code illustrated in FIG. 5A. It may be noted that, in the first column of FIG. 5B, values assigned to the unique general purpose registers eax2 to eax7, and ebx1 may be described in a format that refers to values of different general purpose registers (ebx1, ecx1, etc.).

Next, the final value assigned to the unique general purpose register may be traced. For example, referring to the first column of the table of FIG. 5B, a value assigned to eax2 may be 0x4(% ebx1), a value assigned to ebx1 may be ecx1, and a value assigned to ecx1 may be 0x4(% esp). Based on one tracing a value of eax2 by substituting it in reverse order, it may be 0x4(% esp). In the same way, the final values of values assigned to other unique general purpose registers may be traced and shown in a second column of FIG. 5B.

It will be described with reference to FIG. 4 again. In step S440, among the final values of the general purpose registers traced in step S430, a unique general purpose register having a variable estimation pattern may be identified, and the variable identification information 12 may be stored. As described above, based on an operand of an assembly instruction being 0xN (% ebp) or −0xN (% ebp) (where N may be any number), the operand may be an operand having a variable estimation pattern.

In the second column of the table shown in FIG. 5B, the final value assigned to the unique general purpose register edx1 has a variable estimation pattern as '−0x50(% ebp).' In the assembly code of the user-defined function, the value stored in the unique general purpose register edx1 may be likely to correspond to a local variable of the user function. In the assembly code of the user-defined function, based on edx1 being used as an operand of an assembly instruction or a parameter (argument) of a standard library function, it may be used to infer the type and size of variables based on such assembly instruction patterns or standard library function patterns. This will be described later with reference to FIGS. 7 and 10.

In some embodiments, in step S440, the variable identification information 12, which may be a result of identifying unique general purpose registers having a variable estimation pattern in one user function, may be stored, for example, in the form of FIG. 5C. However, it may be noted that data exemplarily illustrated in FIG. 5C do not reflect the final values of the unique general purpose registers of FIG. 5B, and may be merely for illustrative purposes of the format in which the variable identification information 12 may be stored in some embodiments.

Hereinafter, a process of analyzing a stack frame will be described with reference to steps S450 to S460 of FIG. 4. Steps S450 to S460 may be performed, for example, by the stack frame analysis component 216.

In step S450, by analyzing the structured assembly instructions for each user function, variable estimation patterns may be identified, and stack frame blocks corresponding to the variable estimation patterns may be generated therefrom.

For example, based on variable estimation patterns found in assembly code corresponding to a user function being "−0x44(% ebp)," "−0x18(% ebp)," "−0x10(% ebp)," "−0x56(% ebp)," "−0x1c (% ebp)," 5 stack frame blocks corresponding to each may be generated. The stack frame blocks may include information as shown in Table 1 below.

TABLE 1

| Item | Description |
| --- | --- |
| localType | variable type classification<br>0: parameter<br>1: local variable |
| variableID | EBP pattern string estimated to be a variable |
| ebpDistance | distance from an address pointed to by EBP (relative address) |
| variableSize | (inferred) variable size |
| variableType | (inferred) variable type |
| inferenceLevel | Inference level<br>1: inference with an integer type-related instruction pattern<br>2: inference with a string-related instruction pattern<br>3: inference with a standard library function pattern<br>4: inference with a floating point-related instruction pattern |

In addition, in step S450, the generated stack frame blocks may be sorted based on the ebpDistance. The ebpDistance of the stack frame blocks indicates a location where a variable corresponding to the stack frame block may be stored in the stack frame.

In step S460, the inferred size of the variable corresponding to the stack frame block may be computed based on an ebpDistance difference from the next stack frame block. The computed size may be stored in a variableSize field of the stack frame block.

FIG. 6 is an example of the stack frame information 14 including information on stack frame blocks. FIG. 6 shows the results in which based on variable estimation patterns found in the assembly code corresponding to the user function may be "−0x44(% ebp)," "−0x18(% ebp)," "−0x10(% ebp)," "−0x56(% ebp)," "−0x1c (% ebp)," stack frame blocks corresponding to them may be generated and sorted in steps S450 and S460, and a size of a variable corresponding to each may be inferred.

Referring to FIG. 6, it may be seen that the generated stack frame blocks may be sorted in descending order based on ebpDistance in step S450. In addition, referring to FIG. 6, it may be seen in step S460 that the inferred size of the variable corresponding to the stack frame block may be computed based on the ebpDistance difference from the next stack frame block, and stored in the variableSize field. The computed size may be an initial value inferred based on the stack frame analysis described so far, and may be changed in a process of finally determining the variable type and size in the future (see descriptions regarding to FIGS. 11 and 12 to be described later). Meanwhile, a variableType field and an inferenceLevel field may be finally determined and recorded in a process of determining a variable type (see description regarding to FIG. 11 to be described later) through a process of inferring a type of a variable (see description regarding to FIGS. 7 to 10 to be described later).

Information on the stack frame blocks generated and initialized as described above may be stored as the stack frame information 14 and provided to the type determination unit 230.

So far, the configuration and operation of the variable information collection unit 210 of the device 200 for inferring the type of the variable have been described with reference to FIGS. 3 to 6. Hereinafter, the configuration and operation of the type inference unit 220 will be described with reference to FIGS. 7 to 10.

Figure 7:
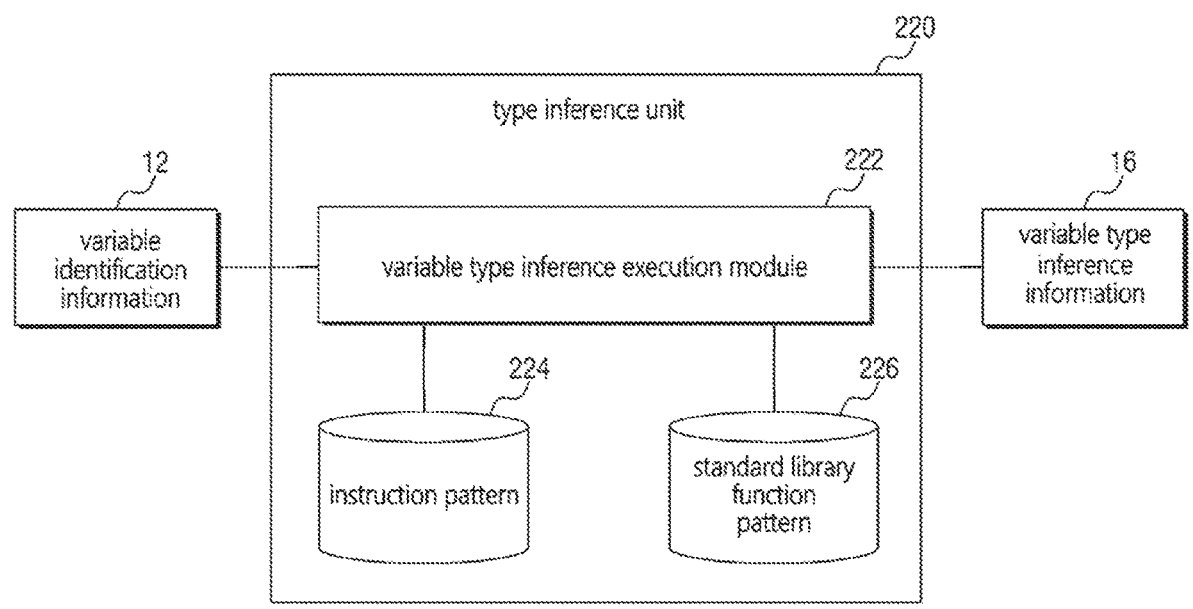
FIG. 7 is a block diagram of a type inference unit of the device for inferring the type of the variable in the binary shown in FIG. 2.

FIG. 7 is a block diagram of the type inference unit 220. The type inference unit 220 includes a variable type inference execution component 222, and may include at least one of an instruction pattern DB 224 and a standard library pattern DB 226. The type inference unit 220 generates the variable type inference information 16 from the assembly code structured for each user function based on the variable identification information 12 and the type inference pattern information provided from the variable information collection unit 210.

The variable type inference execution component 222 reads the assembly code structured for each user function in units of instructions, and determines a correspondence to a variable type inferable assembly instruction (OPCODE) pattern or an instruction pattern that calls a variable type inferable standard library function. Here, the variable type inferable assembly instruction may be identified with reference to the instruction pattern DB 224. In addition, the variable type inferable standard library function may be identified with reference to the standard library function pattern DB 226.

Based on an assembly instruction corresponding to the instruction pattern, the variable type inference execution component 222 determines whether an operand of the assembly instruction or a parameter (factor) of a standard library function corresponds to one of variable estimation patterns (for example, the unique general purpose register described in FIG. 5C.) included in the variable identification information 12. Based on there being a variable estimation pattern corresponding to the operand or parameter, the instruction may be used for variable type inference. More specifically, a variable type known to have the operand of the assembly instruction (OPCODE) of the instruction or a variable type known to have the parameter of the standard library function may be inferred as a type of a variable corresponding to the variable estimation pattern. More details of variable type inference based on the variable type inferable assembly instruction (OPCODE) pattern or the variable type inferable standard library function pattern will be described later with reference to FIGS. 8 to 10.

The variable type inference information 16 includes information on a type of a variable and the reliability of the inference. The variable type inference information 16 generated by the inference by the type inference unit 220 may be provided to the type determination unit 230 to be described later.

Figure 8:
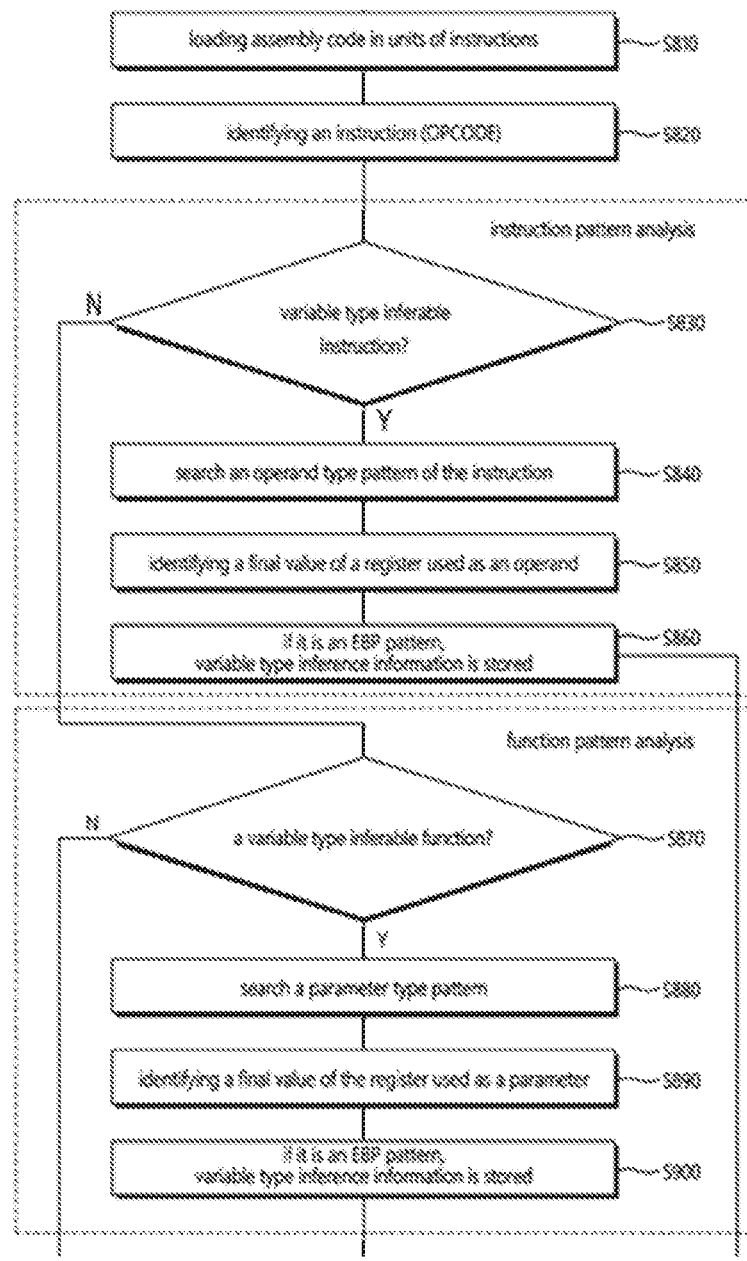

Hereinafter, the operation of the type inference unit 220 will be described with reference to FIG. 8. In interpreting the operation of the type inference unit 220, the contents as described above with reference to FIG. 7 may be reflected.

First, in step S810, the assembly code structured for each user function described above may be loaded in units of instructions. Instructions of the structured assembly code may be given unique register unique identification values by the variable information collection unit 210 described above.

Subsequently, in step S820, an assembly instruction (OPCODE or corresponding mnemonic) of each instruction may be identified.

Steps S830 to S860, which will be described below, may be processes of inferring a type of a variable based on an assembly instruction pattern.

In step S830, it may be determined whether a command of the instruction may be a variable type inferable instruction. Based on the command of the instruction being a variable type inferable instruction, an operand type pattern of the command of the instruction may be inquired in step S840. Here, the pattern may be inquired from the instruction pattern DB 224.

A table shown in FIG. 9 is a table including exemplary assembly instructions that may be used for variable type inference and information on variable types of their operands.

For example, Nos. 1 to 4 of the table in FIG. 9 may be integer type-related instructions. These instructions perform an operation on operands 1 and 2 with integer type data It may be inferred that variables used as operands of these instructions would correspond to integer variable types. On the other hand, Nos. 5 to 24 of FIG. 9 may be string-related instructions. At least one of operands 1 or 2 of these instructions corresponds to string type data, and based on this, it may be inferred that variables used as operands of these instructions would correspond to char(n) or ptr4 types. In addition, Nos. 25 to 27 of FIG. 9 may be floating point-related instructions, and it may be inferred that variables used as operands of these instructions would correspond to variable types such as 'float4,' 'double8,' or the like.

Here, the reliability of the inference may be given differently. For example, as described in the last column of the table shown in FIG. 9, variable type inference based on an integer type-related instruction may be given the lowest reliability level of 1, the reliability of variable type inference based on a string-related instruction may be given as 2, and variable type inference based on a floating point-related instruction may be given the highest reliability level of 4.

In step S850, a final value of a register used as an operand of an instruction having the instruction pattern may be identified. The final value may be a final value derived as a result of performing step S430 described with reference to FIG. 4 regarding the operation of the variable information collection unit 210. For example, based on an operand of the instruction being edx1, '−0x50(% ebp)' may be identified as a final value by referring to a final value tracing result of the edx1 register shown in the second column of FIG. 5B.

In step S860, based on the final value having a variable estimation pattern (0xN (% ebp) or −0xN (% ebp)), inference information on the type of the variable may be stored. For example, since an operand of the instruction may be edx1, a final value tracing result of the edx1 register may be '−0x50(% ebp)', and '−0x50(% ebp)' has a variable estimation pattern, a type of a variable corresponding to '−0x50(% ebp)' may be inferred by referring to the instruction (OPCODE) pattern of the instruction.

Each information inferred may be stored as the variable type inference information 16, respectively. The variable type inference information 16 includes information on a type of a variable and the reliability of the inference. The variable type inference information 16 may be provided to the variable type determination component 232 to be described later.

Steps S870 to S900, which will be described below, may be processes for inferring a type of a variable based on a standard library function pattern. In step S830 described above, based on it being determined that the command of the instruction may not be a variable type inferable instruction, it proceeds to step S870.

In step S870, it may be determined whether the command of the instruction may be an instruction that calls a variable type inferable standard library function. In step S880, a parameter type pattern of the standard library function may be inquired. Here, the pattern may be inquired from the standard library function pattern DB 226.

Figure 10A:
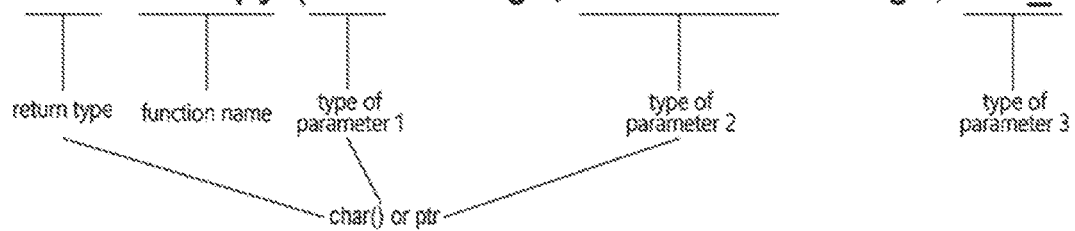
FIGS. 10A and 10B are diagrams for explaining a method in which the variable type inference execution component illustrated in FIG. 7 infers a variable type by referring to a standard library function.

In the standard library functions, as shown in FIG. 10A, a type of a return value of a function, the number and type of parameters, or the like may be pre-determined, and information on this may already be known. The type of data used as the return value or parameter of the standard library function may be inferred.

Figure 10B:
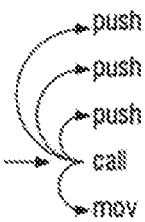

For example, it will be described with reference to assembly code instructions shown in FIG. 10B. An instruction of a fifth row of code shown in FIG. 10B may be an instruction to call the 'strncpy' function, which may be one of the standard library functions. In addition, a first to fourth row instructions preceding the instruction may be instructions that store parameters to be passed to a 'strncpy' function in a stack. In addition, an instruction in a sixth row may be an instruction that stores a value of a register in which a return value of the 'strncpy' function may be stored in a stack. Based on storage spaces being used to store values of parameters of the 'stmcpy' function correspond to the variable identification information 12 as shown in FIG. 5C, a variable type may be inferred based on information already given about the type of the parameter of the 'strncpy' function.

The reliability of the inference based on the standard library function pattern may be given a value higher than the reliability of variable type inference based on a string-related instruction and lower than the reliability of variable type inference based on a floating-point related instruction. For example, the reliability of the inference based on the standard library function pattern may be given 3.

In step S890, the final value of the register used as the parameter of the standard library function may be identified. Step S890 may be performed in a similar manner to step S850.

In step S900, based on the final value having a variable estimation pattern, inference information on the type of the variable may be stored. Step S900 may be performed in a similar manner to step S860.

Each of information inferred may be stored as the variable type inference information 16, respectively. The variable type inference information 16 includes information on a type of a variable and the reliability of the inference. The variable type inference information 16 may be provided to the variable type determination component 232 to be described later.

So far, the configuration and operation of the type inference unit 210 of the device 200 for inferring the type of the variable have been described with reference to FIGS. 7 to 10. Hereinafter, the configuration and operation of the type determination unit 230 will be described with reference to FIGS. 11 to 12.

Figure 11:
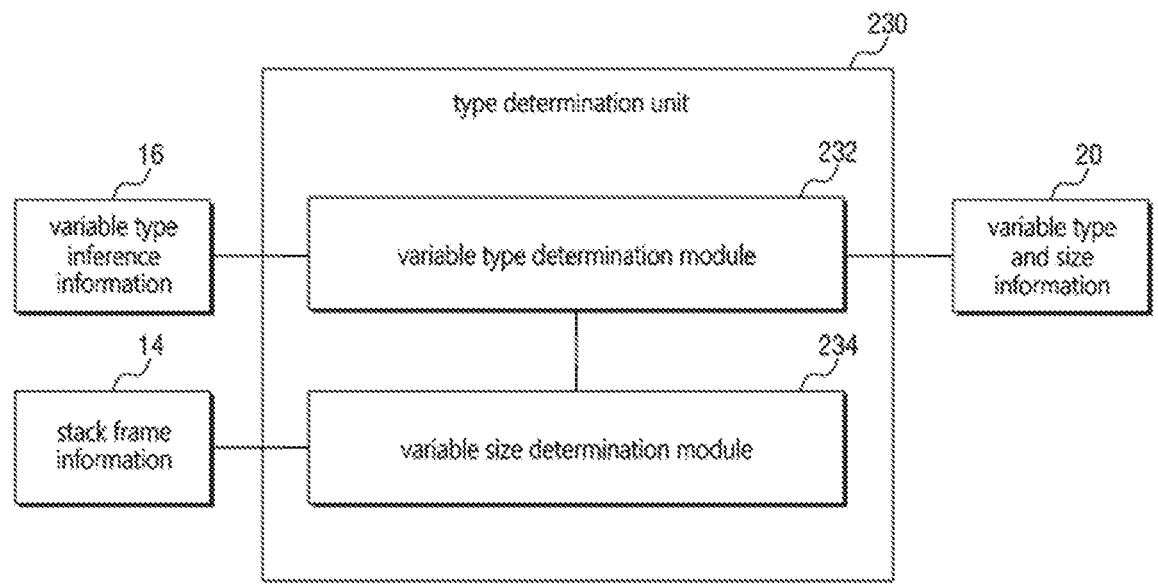
FIG. 11 is a block diagram of a type determination unit of the device for inferring the type of the variable in the binary shown in FIG. 2.

FIG. 11 is a block diagram of the type determination unit 230. The type determination unit 230 may include a variable type determination component 232 and a variable size determination component 234. The type determination unit 230 finally determines each variable type and array size for each user function by synthesizing the variable type inference information 16 provided by the type inference unit 220 and the stack frame information 14 provided by the variable information collection unit 210. Variable type and array size information 20 generated by the type determination unit 230 may be used in the process of patching the vulnerability of the binary as described above.

The variable type determination component 232 determines a variable type based on the variable type inference information 16. Based on there being one variable type inference information 16 for any one variable, a variable type indicated by the one variable type inference information 16 may be determined as the type of the variable.

However, the variable type inference execution component 222 of the type inference unit 220 described above reads structured assembly code for each user function in units of instructions. Then, it determines whether each instruction corresponds to a variable type inferable instruction or function, and generates the variable type inference information 16 therefrom. A plurality of variable type inference information 16 about the same variable may be generated from a plurality of instructions in a user function. Based on the types of the variables indicated by the plurality of variable type inference information 16 about the same variable being different from each other, one of these types may be determined as the type of the variable.

The variable type determination component 232 reads the variable type inference information 16 in units of variables, and determines whether the variable type inference information 16 corresponding to the variable indicates two or more different types. Based on it indicating to two or more types, the variable type inference information 16 having the highest inference reliability may be selected among the variable type inference information 16. In some embodiments, the reliability of information inferred based on a floating point-related instruction pattern may be 4, the reliability of information inferred based on a string-related command pattern may be 2, and the reliability inferred based on an integer type-related instruction pattern may be 1. The reliability of information inferred based on a standard library function pattern may be 3. Based on the variable type inference information 16 having the highest inference reliability among the variable type inference information 16 may be selected, it may be determined as the type of the variable.

If the reliabilities of the variable type inference information 16 may be the same, a type having a large number of variable type inference information 16 may be determined as the type of the variable. For example, based on 3 pieces of information indicating an 'int4' type and 2 pieces of information indicate a 'float4' type among 5 pieces of the variable type inference information 16 on a variable, the type of the variable may be determined as the 'int4' type.

As described above, information on the type of variables determined by the variable type determination component 232 may be reflected in a stack frame block corresponding to each variable, which may be included in the stack frame information 14 provided by the stack frame analysis component 216 of the variable information collection unit 210.

Hereinafter, a process of determining a size of a variable based on the stack frame information 14 reflecting information on the variable type by the variable size determination component 234 of the type determination unit 23 will be described with reference to FIGS. 12A and 12B.

First, in step S1210, the stack frame information 14 may be loaded in units of stack frame blocks. The stack frame information 14 may have a format such as a table shown in FIG. 6, for example. Variable type information determined by the type determination component 232 described above for each variable may be additionally included in the stack frame information 14.

In step S1220, variable type information described in a first stack frame block may be identified.

In step S1230, it may be determined whether the variable type information indicates that it may be an 'array(n) or ptr4' type. Based on the variable type information not indicating that it may be the 'array(n) or ptr4' type, it proceeds to step S1250.

If the variable type information indicates that it may be the 'array(n) or ptr4' type, steps S1231 to S1234 may be performed to determine which of the 'array(n)' and 'ptr4' types.

In step S1231, a second stack frame block, which may be a next block of the first stack frame block, may be identified. Based on variable type information being recorded in the second stack frame block, a variable corresponding to the first stack frame block may be determined to be a variable of type 'ptr4', and a size may be determined to be a size of the 'ptr4' type, for example, 4 bytes (step S1232). Based on no variable type information being recorded in the second stack frame block subsequent to the first stack frame, the second stack frame block may be deleted (step S1233). In addition, a variable corresponding to the first stack frame block may be determined to be an 'array(n)' type, that may be, an array (step S1234). Although not shown, in some embodiments, a size of the variable corresponding to the first stack frame block may be corrected by adding a size of a variable recorded in the second stack frame block to a variable described in the first stack frame block. Further, it may be determined whether variable type information may be recorded for a third stack frame block subsequent to the second stack frame. Based on there being no recorded variable type information, a process of summing a size of a variable recorded in the third stack frame block to the size of the variable described in the first stack frame block may be repeated.

Through the operations described above, the type and size of a variable corresponding to the first stack frame block may be finally determined.

In step S1230, based on the variable type information described in the first stack frame block not indicating that it may be the 'array(n) or ptr4' type, it proceeds to step S1250.

In step S1250, it may be determined whether a size corresponding to the type of the variable recorded in the first stack frame block exceeds the size of the variable recorded in the first stack frame block. Based on the size corresponding to the type of the variable recorded in the first stack frame block not exceeding the size of the variable recorded in the first stack frame block, the type of the variable recorded in the first stack frame block and the size corresponding to the type may be finally determined as the type and size of the variable corresponding to the block (not shown).

If the size corresponding to the type of the variable recorded in the first stack frame block exceeds the size of the variable recorded in the first stack frame block, a second stack frame block subsequent to the first stack frame block may be identified. Based on variable type information being recorded in the second stack frame block (step S1251), the reliability of the variable type inference information recorded in the first stack frame block and the reliability of the variable type inference information recorded in the second stack frame may be compared with each other (step S1252).

If the reliability of the variable type inference information recorded in the first stack frame block may be lower than the reliability of the variable type inference information recorded in the second stack frame block, the first stack frame block may be deleted. In other words, the information described in the first stack frame block may be discarded (step S1253).

If, in step S1251, variable type information may be not recorded in the second stack frame block, or based on, in step S1252, the reliability of the variable type inference information recorded in the first stack frame block being greater than or equal to the reliability of the variable type inference information described in the second stack frame block, it proceeds to step S1254.

In step S1254, the second stack frame block may be deleted. In other words, the information described in the second stack frame block may be discarded.

In step S1255, the size corresponding to the type of the variable recorded in the first stack frame block may be finally determined as the size of the variable corresponding to the first stack frame block.

Although not shown, the steps S1210 to S1255 may be performed repeatedly for all stack frame blocks included in the stack frame information 14, so that the types and sizes of variables declared in a user function corresponding to the stack frame information may finally be determined.

Figure 12A:
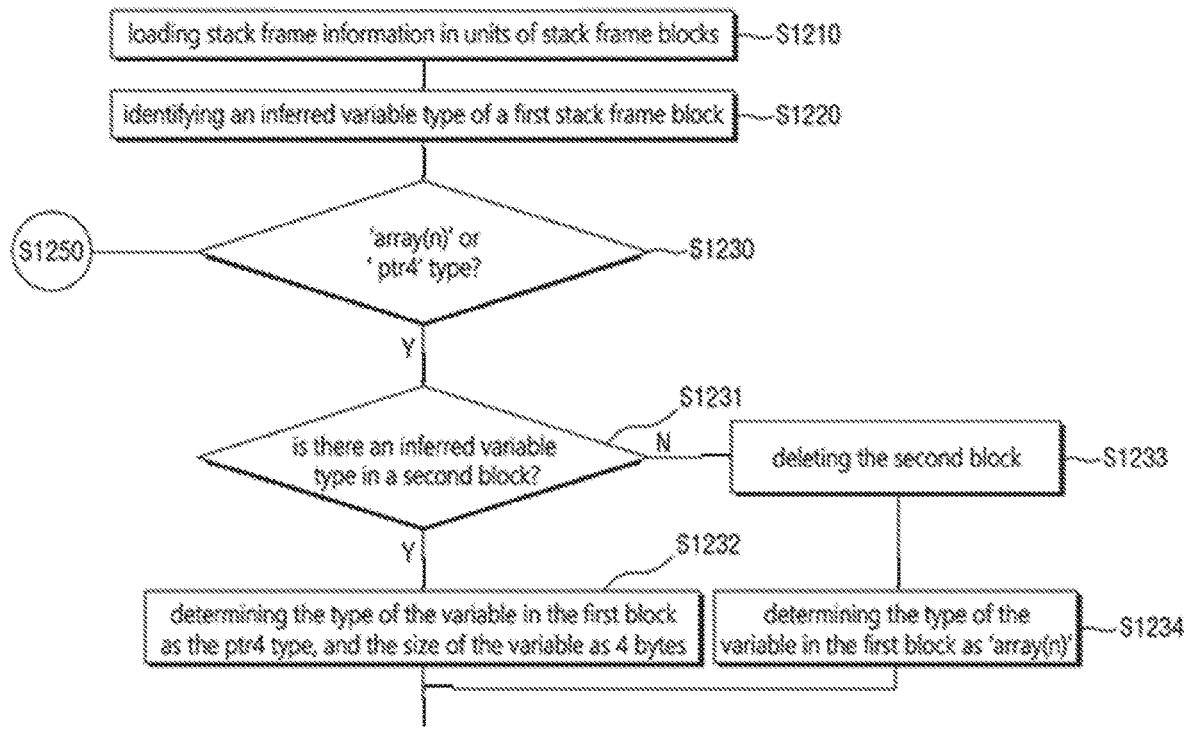
FIGS. 12A and 12B are diagrams for explaining the operation of the type determination unit shown in FIG. 11.
Figure 12B:
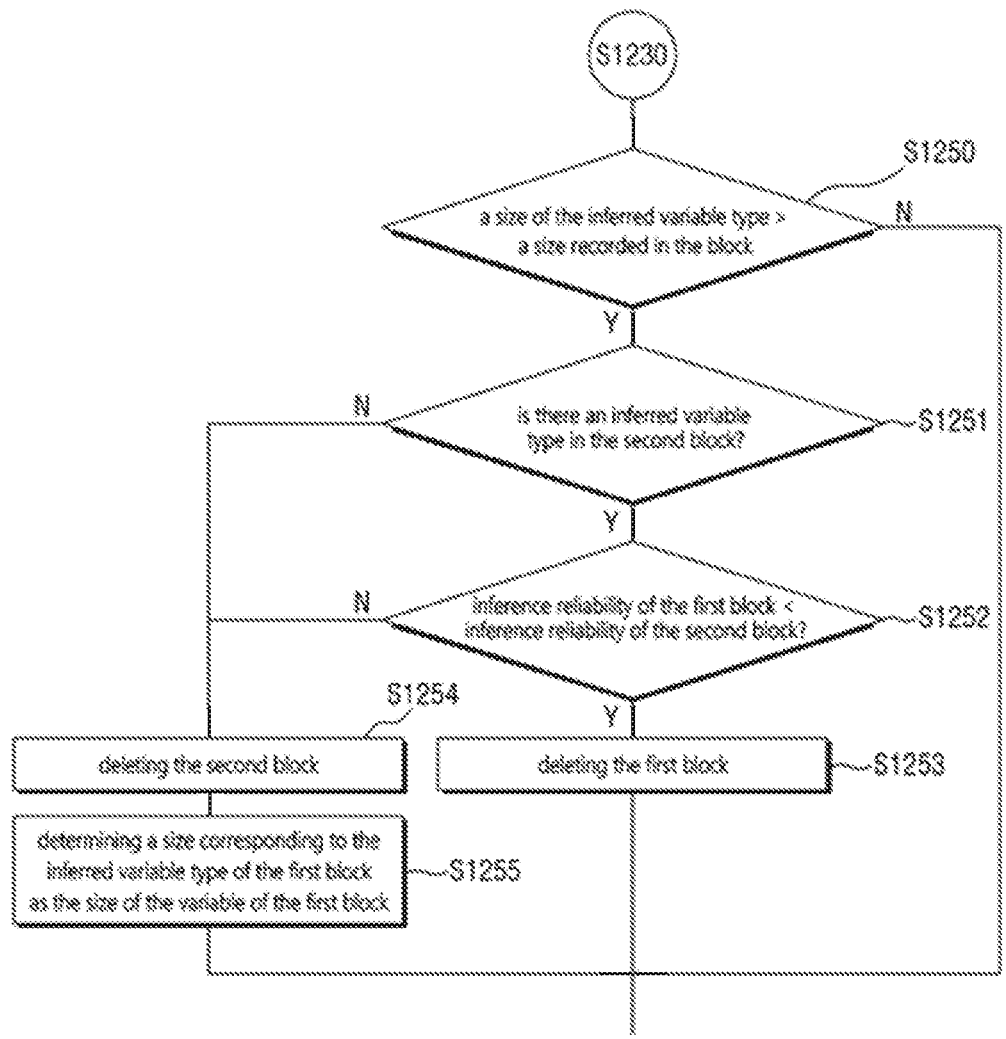

So far, referring to FIGS. 11, 12A, and 12B, the configuration of the type determination unit 230 of the 200 device for inferring the type of the variable, and a process of the type determination unit 230 finally determining the type and size of the variables based on the variable type inference information 16 and the stack frame information 14 has been described. As described above, the information 20 on the type and size of the variable calculated by the type determination unit 230 may be used in a process of patching a binary vulnerability.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

In the above description, it is described that all the components constituting the embodiments of the present disclosure may be combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the embodiments without substantially departing from the principles of the present disclosure. The disclosed embodiments of the present disclosure are used in a generic and descriptive sense and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method for identifying a type of a variable within a binary, the method being performed on a computing device, and comprising:
    identifying a variable from disassembly code of a binary; and
    determining a type of the variable based on an instruction of the disassembly code associated with the variable,
    wherein determining the type of the variable comprises:
    determining a plurality of variable type candidates corresponding to a plurality of instructions associated with the variable; and
    determining the type of the variable among the plurality of variable type candidates,
    wherein determining the plurality of variable type candidates comprises assigning an inference reliability to each of the plurality of variable type candidates based on a corresponding instruction where the variable is used as an operand or based on a standard library function where the variable is used as a parameter, and
    wherein determining the type of the variable among the plurality of variable type candidates comprises:
    identifying a first variable type candidate, among the plurality of variable types, having the highest inference reliability; and
    determining the first variable type candidate as the type of the variable.

2. The method of claim 1, wherein identifying the variable comprises identifying an operand as the variable, the operand accessing a memory using a base pointer register and an index value.

3. The method of claim 2, wherein identifying the variable comprises:
    analyzing the instructions of the disassembly code and tracing a final value of a value assigned to a general register; and
    identifying the general purpose register as the variable based on the traced final value being a value obtained by accessing the memory using the base pointer register and the index, and wherein the tracing comprises substituting the final value obtained by tracing a value assigned to a different register into the value assigned to the general purpose register based on the value assigned to the general purpose register referring to the different register.

4. The method of claim 1, wherein determining the type of the variable further comprises:
counting the corresponding instructions for each of the plurality of variable type candidates; and
identifying a second variable type candidate, among the plurality of variable types, having the highest count.

5. The method of claim 1, wherein an integer instruction has a first inference reliability,
wherein a string instruction has a second inference reliability higher than the first inference reliability
wherein the standard library function has a third inference reliability higher than the second inference reliability, and
wherein a floating point instruction has a fourth inference reliability higher than the third inference reliability.

6. A method for identifying a size of a variable in a binary, the method being performed on a computing device, and comprising:
identifying a plurality of variables from disassembly code of a binary;
determining, for each of the plurality of variables, an initial estimated size of the variable; and
determining, for each of the plurality of variables, the size of the variable based on an inferred variable type and the initial estimated size of the variable,
wherein determining the initial estimated size of the variable comprises:
sorting the plurality of identified variables based on a relative address within the memory to generate a sorted variable list; and
determining, for each of the plurality of variables, a difference of the relative address within the memory with a next variable on the sorted variable list as the initial estimated size of the variable.

7. The method of claim 6,
wherein identifying the plurality of variables comprises identifying an operand as the variable, the operand accessing a memory using a base pointer register and an index value,
and
wherein the relative address within the memory is the index value.

8. The method of claim 7, further comprising:
inferring a type of each variable based on an instruction where each variable is used as an operand or based on a standard library function where each variable is used as a parameter.

9. The method of claim 8, wherein inferring the type of each variable comprise:
determining a plurality of variable type candidates for each variable based on a plurality of instructions targeting each variable; and
determining the type of each variable based on the plurality of variable type candidates.

10. The method of claim 7, wherein determining the size of the variable comprises:

identifying a first variable included in the sorted variable list and a second variable subsequent to the first variable on the sorted variable list;
based on an inferred variable type of the first variable being one of an array type and a pointer type,
determining whether an inferred variable type for the second variable exists;
in response to determining that the inferred variable type for the second variable exists, determining the type of the first variable as the pointer type and determining the size of the first variable as the size corresponding to the pointer type; and
in response to determining that there is no inferred variable type for the second variable, determining the type of the first variable as the array type, and determining the initial estimated size of the variable of the first variable as the size of the first variable.

11. The method of claim 7, wherein determining the size of the variable comprises:
identifying a first variable included in the sorted variable list and a second variable subsequent to the first variable on the sorted variable list;
based on the size corresponding to an inferred variable type of the first variable being greater than the initial estimated size of the variable of the first variable,
determining whether an inferred variable type for the second variable exists;
in response to determining that the inferred variable type for the second variable exists, comparing an inference reliability of the type of the first variable with an inference reliability of the type of the second variable and removing one of the first variable and the second variable; and
in response to determining that there is no inferred variable type for the second variable, determining the size corresponding to the inferred variable type of the first variable as the size of the first variable.

12. A non-transitory computer-readable recording medium having computer program instructions for identifying a size of a variable in a binary, wherein the computer program instructions are executed by a processor of a computing device for performing operations comprising:
identifying a plurality of variables from disassembly code of a binary;
determining, for each of the plurality of variables, an initial estimated size of the variable; and
determining, for each of the plurality of variables, the size of the variable based on an inferred variable type and the initial estimated size of the variable,
wherein determining the initial estimated size of the variable comprise:
sorting the plurality of identified variables based on a relative address within the memory to generate a sorted variable list; and
determining, for each of the plurality of variables, a difference of the relative address within the memory with a next variable on the sorted variable list as the initial estimated size of the variable.

* * * * *